US011967763B2

(12) United States Patent
Onishi et al.

(10) Patent No.: US 11,967,763 B2
(45) Date of Patent: Apr. 23, 2024

(54) ANTENNA APPARATUS AND SPACECRAFT

(71) Applicant: Institute for Q-shu Pioneers of Space, Inc., Fukuoka (JP)

(72) Inventors: Shunsuke Onishi, Fukuoka (JP); Tetsuo Yasaka, Fukuoka (JP); Kazuo Kuno, Fukuoka (JP); Masahiko Uetsuhara, Fukuoka (JP); Yohei Koga, Fukuoka (JP); Shinji Ito, Fukuoka (JP); Yonosuke Ichiki, Fukuoka (JP); Kazuo Kiso, Fukuoka (JP); Mutsuhito Tobo, Fukuoka (JP)

(73) Assignee: Institute for Q-shu Pioneers of Space, Inc., Fukuoka (JP)

( * ) Notice: Subject to any disclaimer, the term of this patent is extended or adjusted under 35 U.S.C. 154(b) by 302 days.

(21) Appl. No.: 17/604,367

(22) PCT Filed: Apr. 18, 2019

(86) PCT No.: PCT/JP2019/016674

§ 371 (c)(1),
(2) Date: Oct. 15, 2021

(87) PCT Pub. No.: WO2020/213136

PCT Pub. Date: Oct. 22, 2020

(65) Prior Publication Data

US 2022/0181788 A1 Jun. 9, 2022

(51) Int. Cl.
*H01Q 1/24* (2006.01)
*H01Q 1/08* (2006.01)
(Continued)

(52) U.S. Cl.
CPC ............... *H01Q 15/20* (2013.01); *H01Q 1/08* (2013.01); *H01Q 1/1235* (2013.01); *H01Q 1/288* (2013.01); *H01Q 19/19* (2013.01)

(58) Field of Classification Search
CPC H01Q 19/19; H01Q 1/08; H01Q 1/28; H01Q 15/161; H01Q 1/288; H01Q 3/20; B64G 1/1007; B64G 1/222; B64G 1/66
(Continued)

(56) References Cited

U.S. PATENT DOCUMENTS 5,446,474 A * 8/1995 Wade .................. H01Q 15/161 343/915
2019/0165481 A1 5/2019 Onishi et al.

FOREIGN PATENT DOCUMENTS

JP H05-70012 U 9/1993
JP H09-266408 A 10/1997
(Continued)

OTHER PUBLICATIONS

International Search Report and Written Opinion from the Japanese Search Authority of the Japan Patent Office in PCT/JP2019/016674, dated Jun. 4, 2019, 5 pages (with English translation of the International Search Report and Written Opinion, 5 pages).

*Primary Examiner* — Jean B Jeanglaude
(74) *Attorney, Agent, or Firm* — Klarquist Sparkman, LLP

(57) ABSTRACT

Spacecraft and antenna apparatus that can be more easily deployed from a stored state can include: a main-reflection unit including a plurality of ribs formed to be deployable in a stored state in which the ribs are folded and a sheet body provided between a plurality of the ribs and configured to be capable of reflecting a radio wave radiated from a radiator and emitting the radio wave outside, and a restriction member configured to restrict deployment of the plurality of ribs in the stored state, and release the restriction by operation of a restriction release member different from the main-reflection unit.

16 Claims, 13 Drawing Sheets

(51) Int. Cl.
*H01Q 1/12* (2006.01)
*H01Q 1/28* (2006.01)
*H01Q 15/20* (2006.01)
*H01Q 19/19* (2006.01)

(58) Field of Classification Search
USPC .......................................................... 343/702
See application file for complete search history.

(56) References Cited

FOREIGN PATENT DOCUMENTS

| | | | |
|---|---|---|---|
| JP | 2005086698 | A | 3/2005 |
| WO | 2017221872 | A1 | 12/2017 |

* cited by examiner

[FIG. 1]
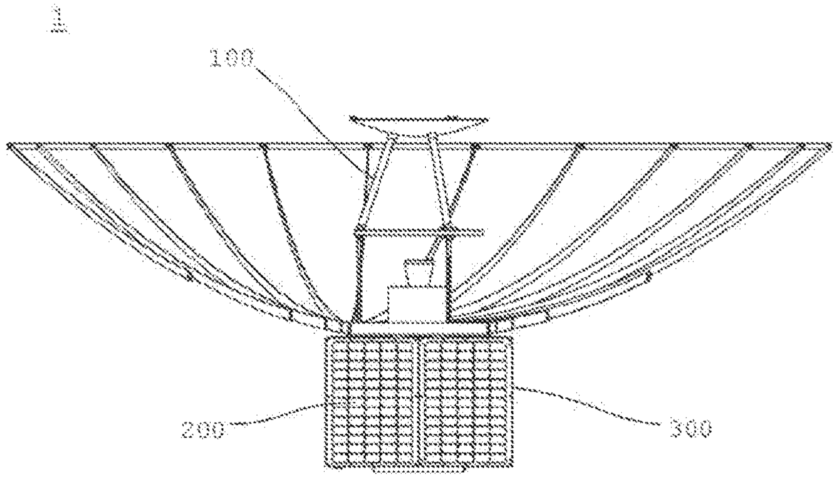
[FIG. 2]
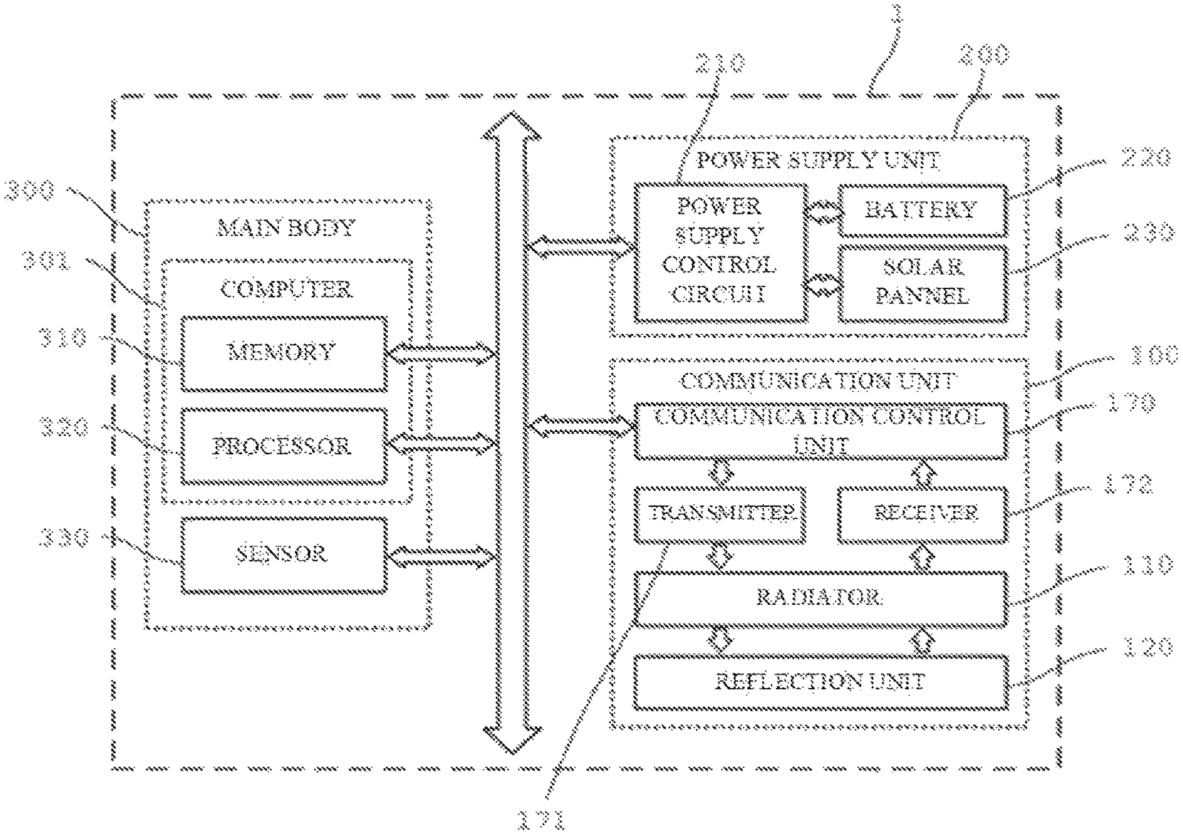

[FIG. 3A]
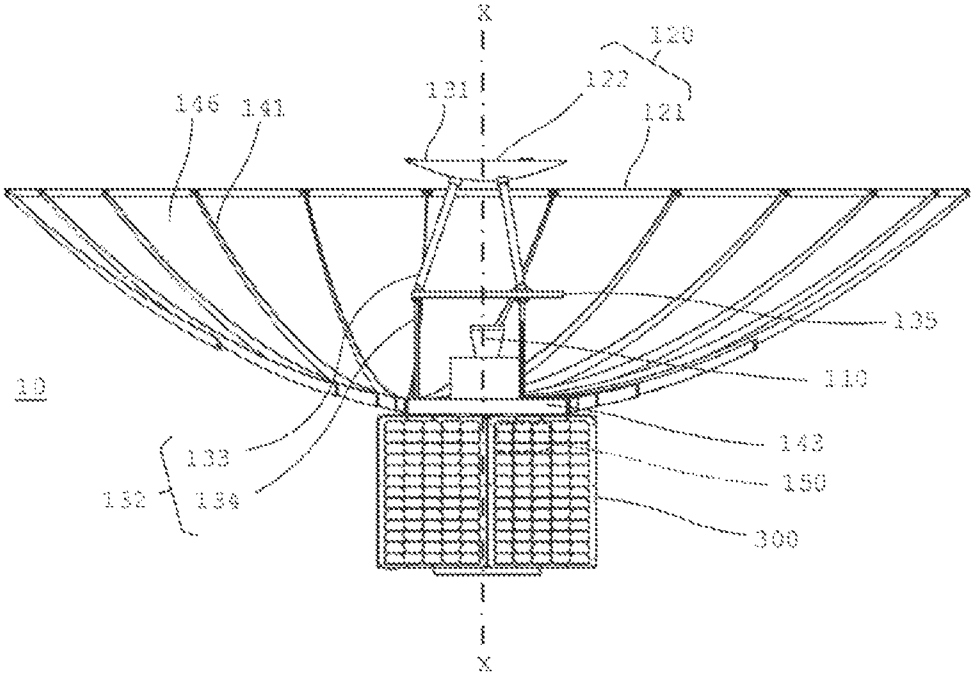
[FIG. 3B]
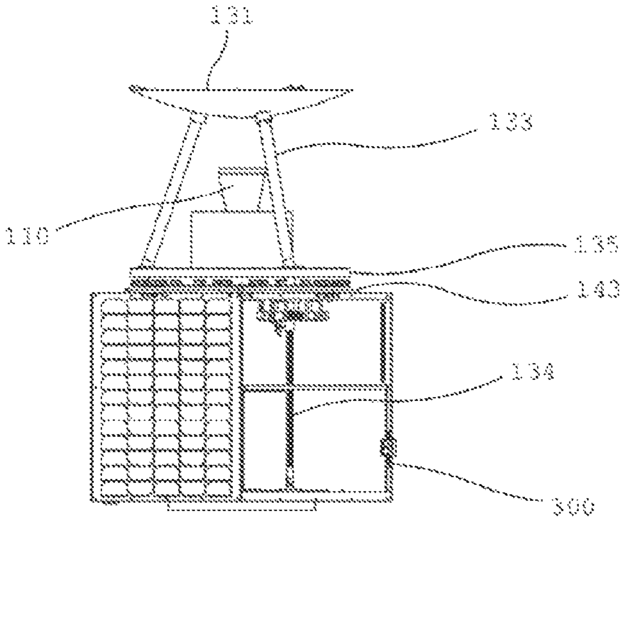

[FIG. 4]
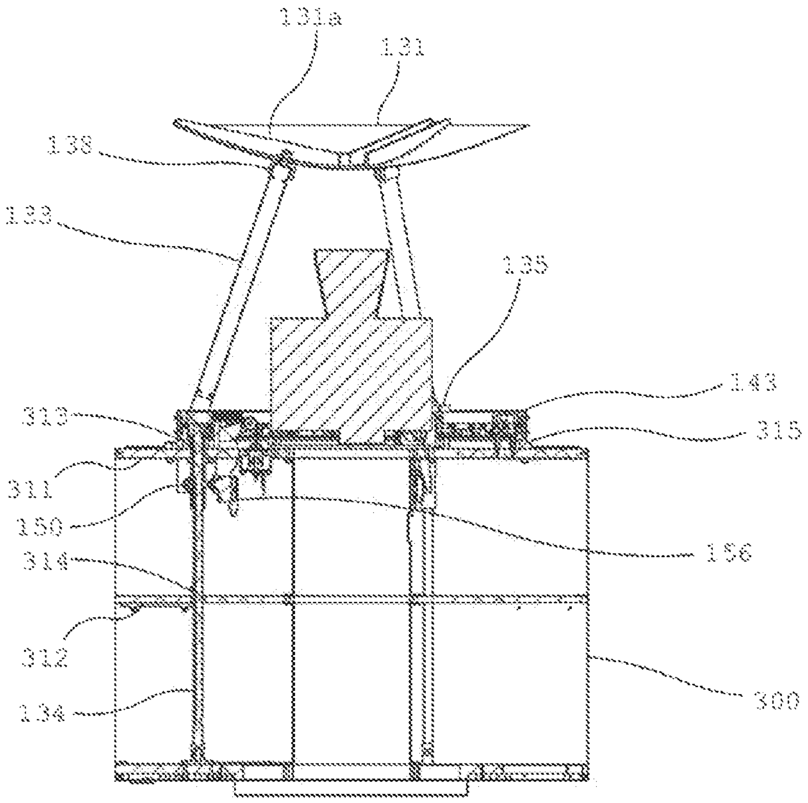

[FIG. 5]
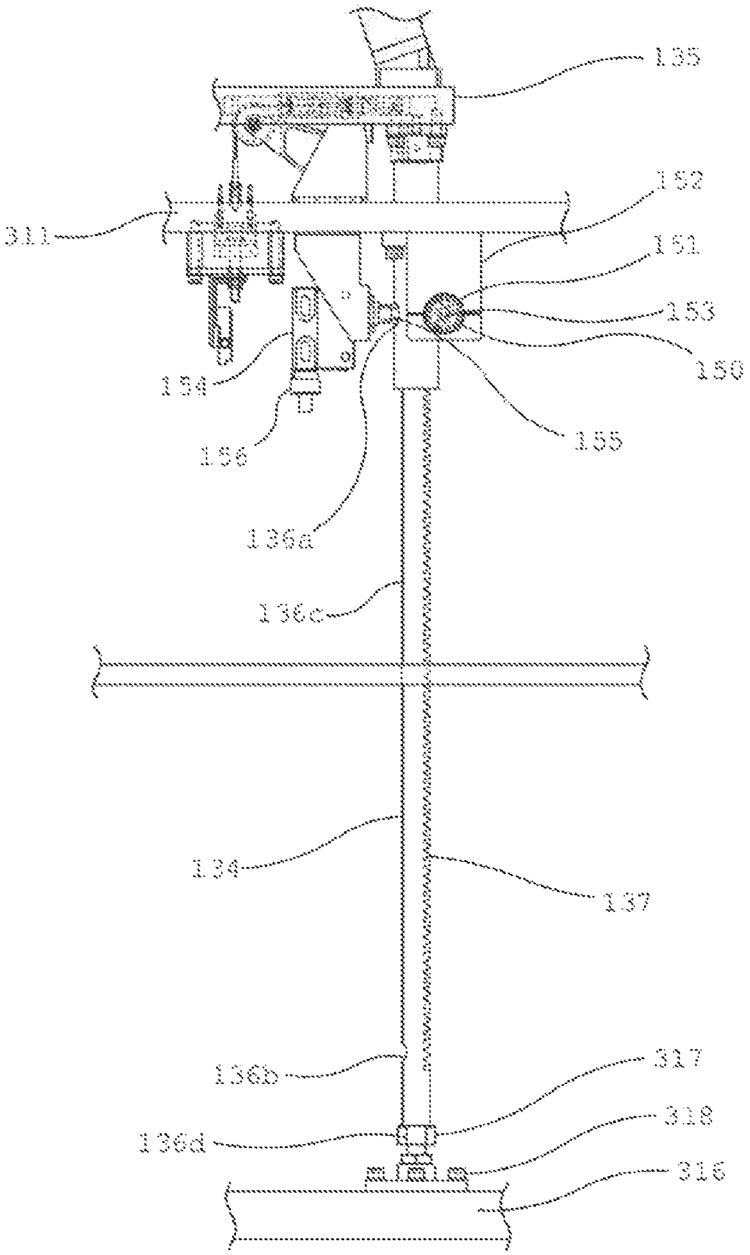

[FIG. 6A]
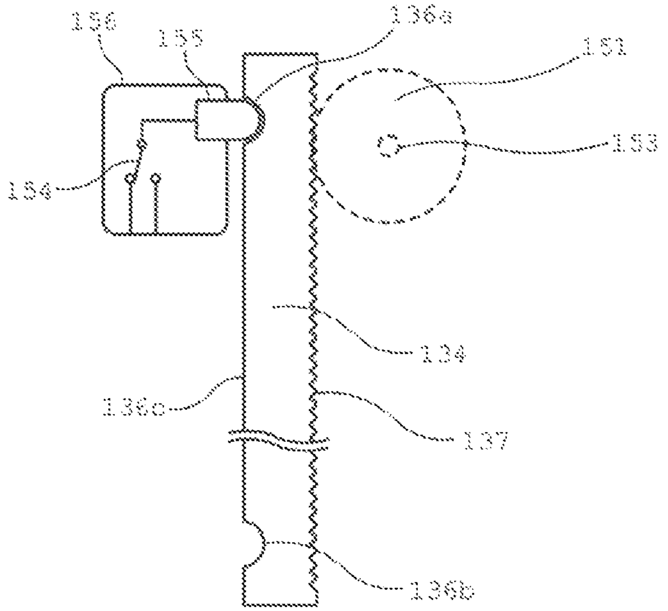
[FIG. 6B]
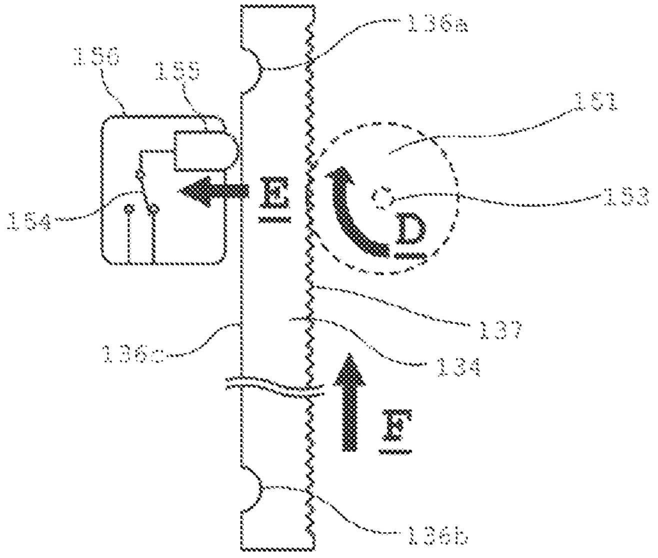

[FIG. 6C]
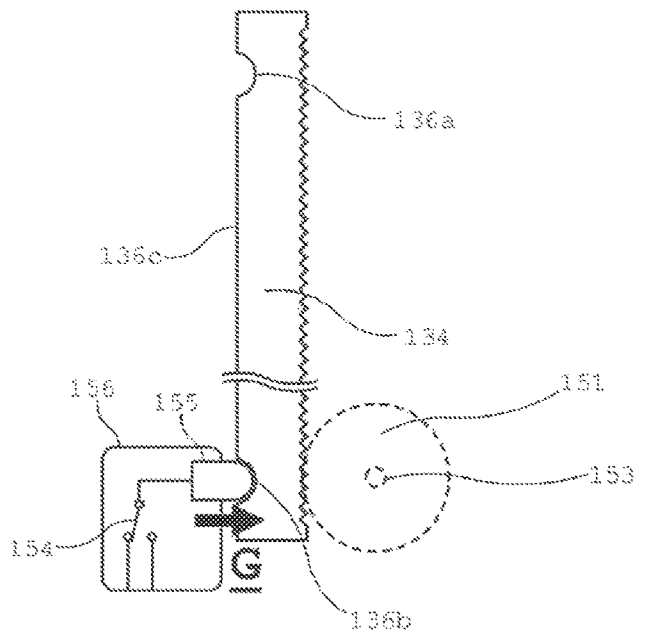
[FIG. 7]
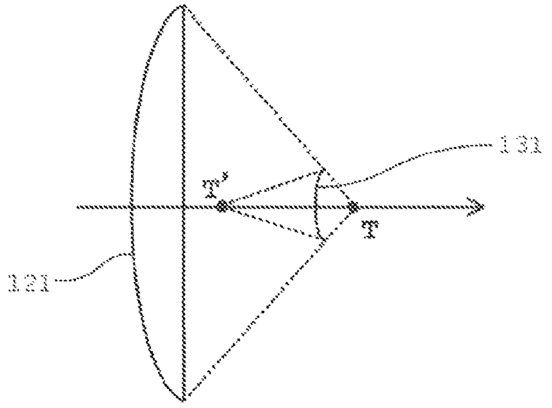
[FIG. 8A]
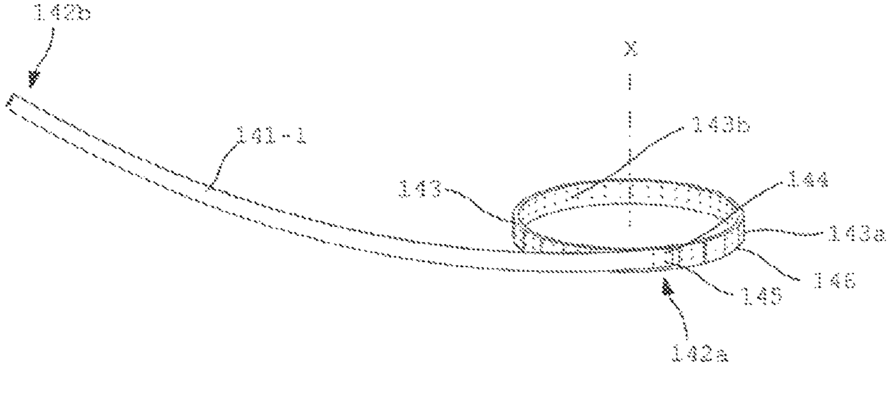

[FIG. 8B]
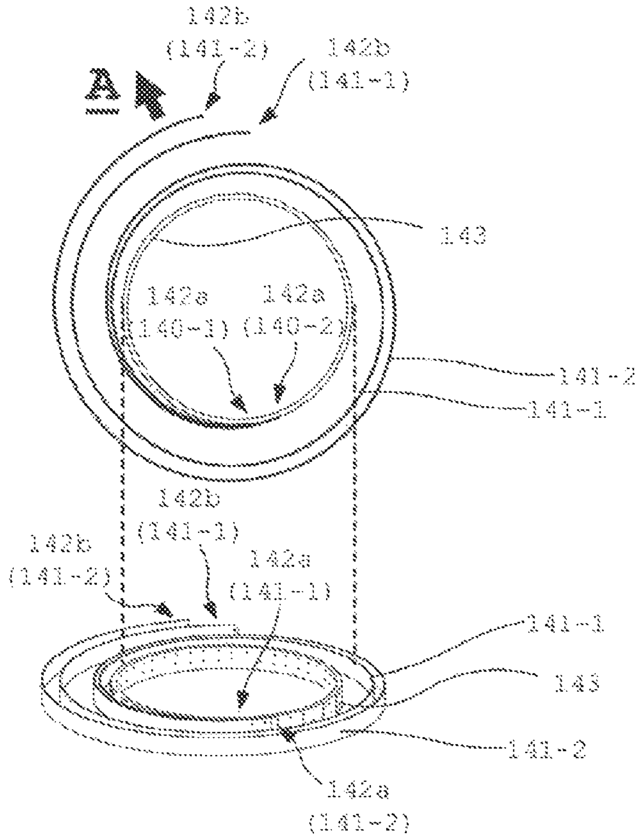

[FIG. 9]
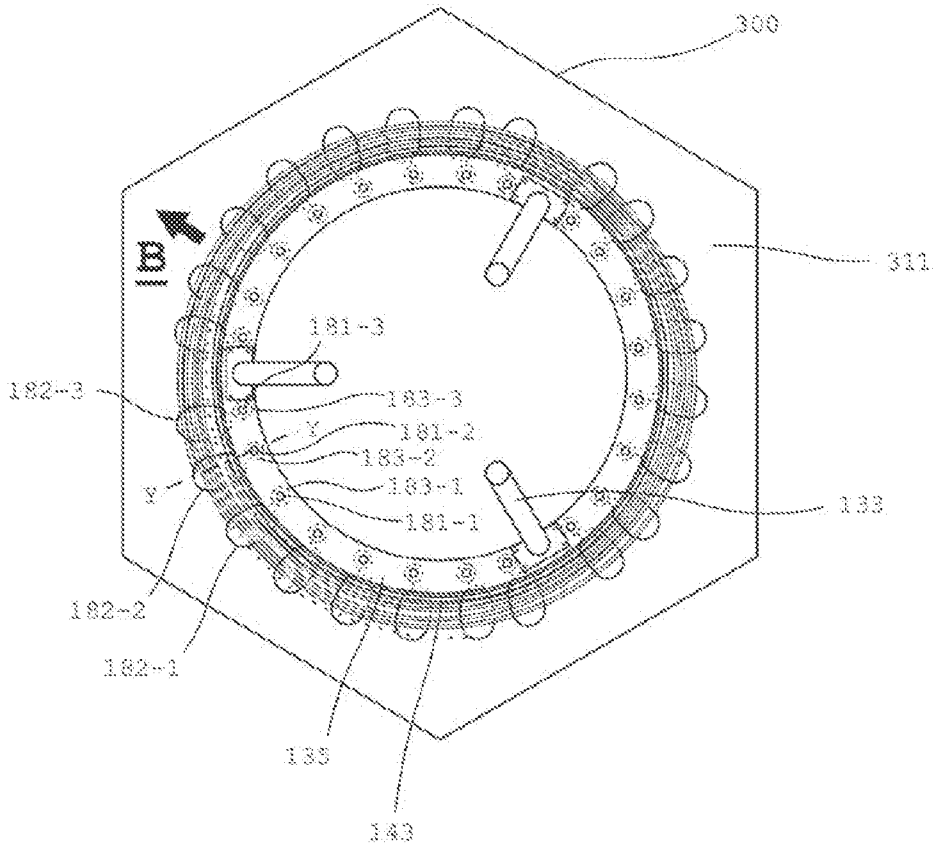
[FIG. 10]
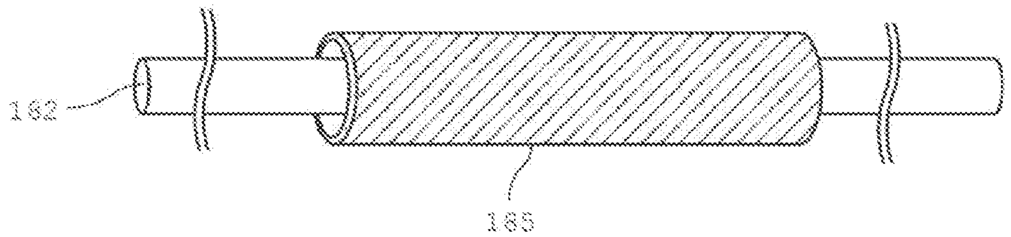

[FIG. 11A]
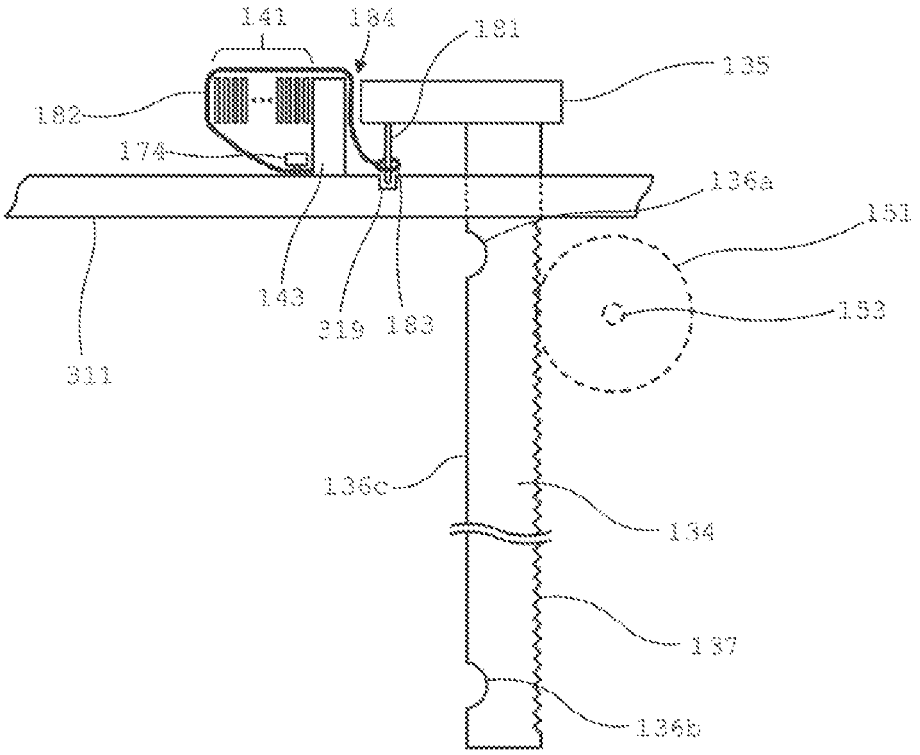
[FIG. 11B]
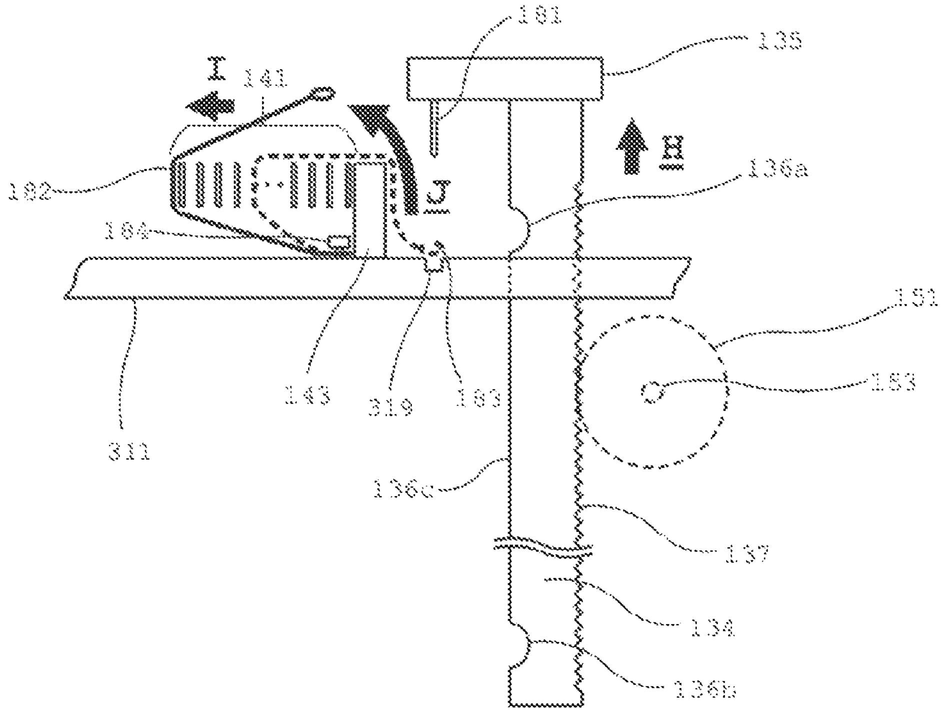

[FIG. 12]
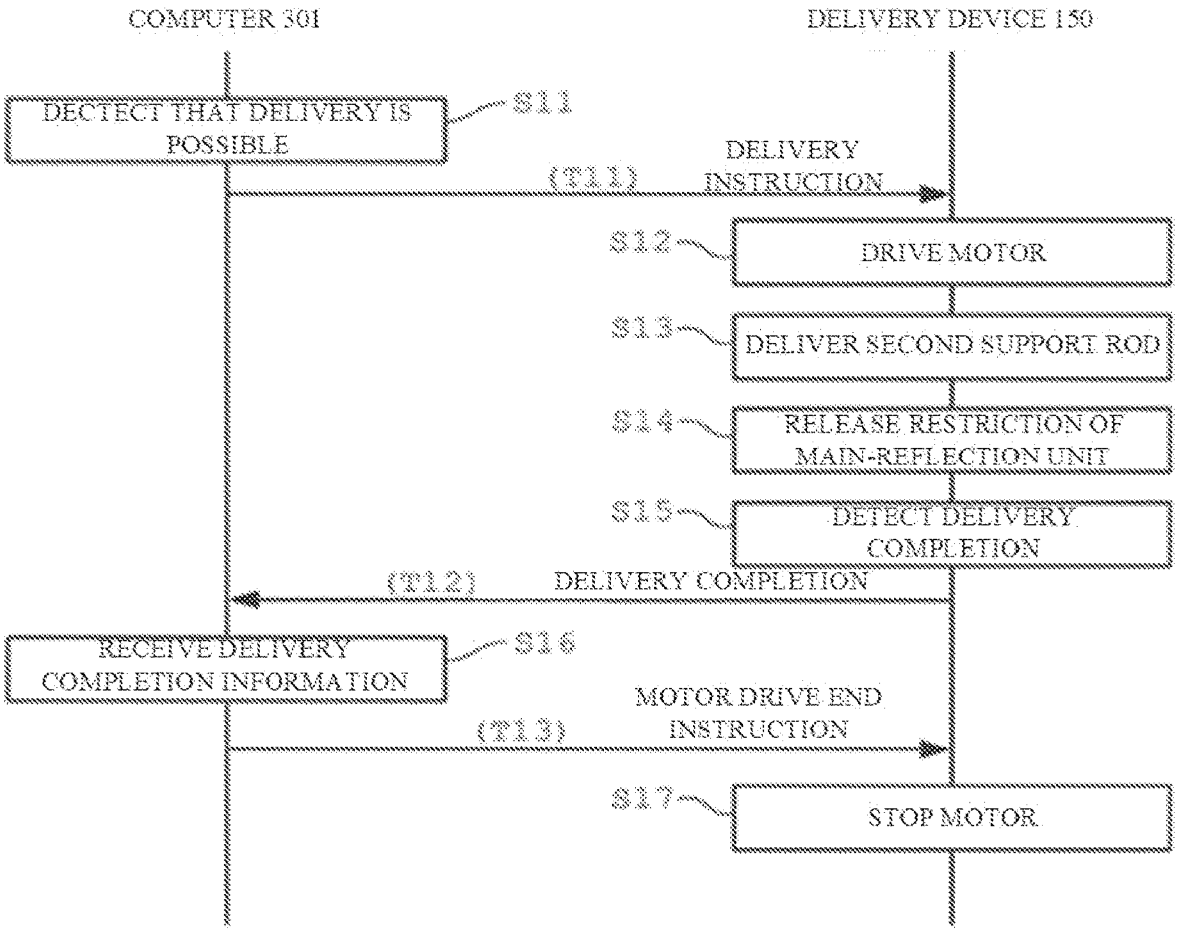

[FIG. 13]
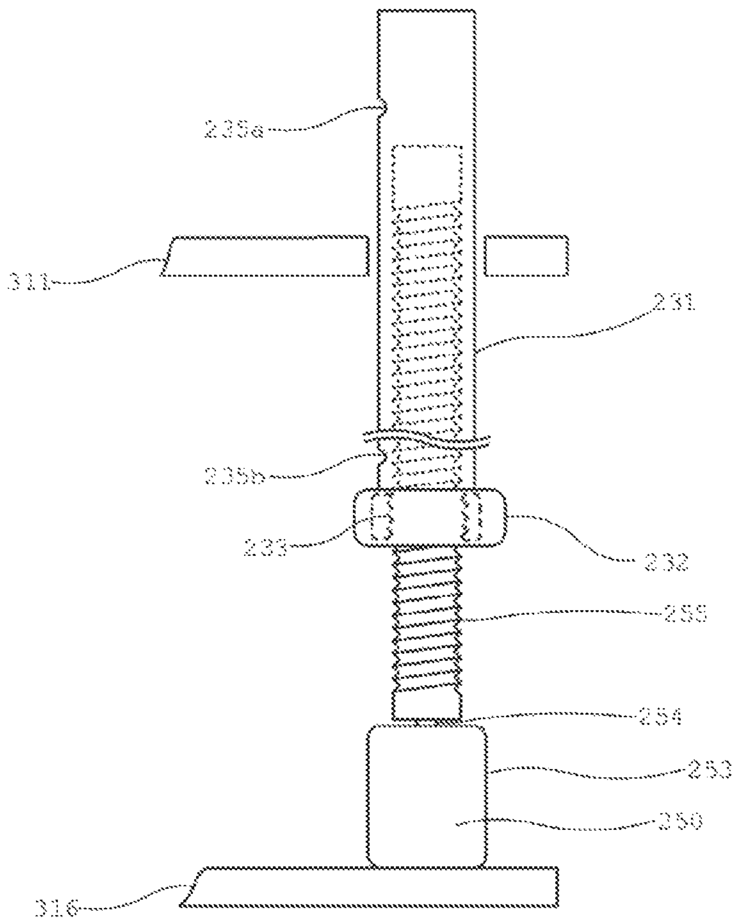

[FIG. 14A]
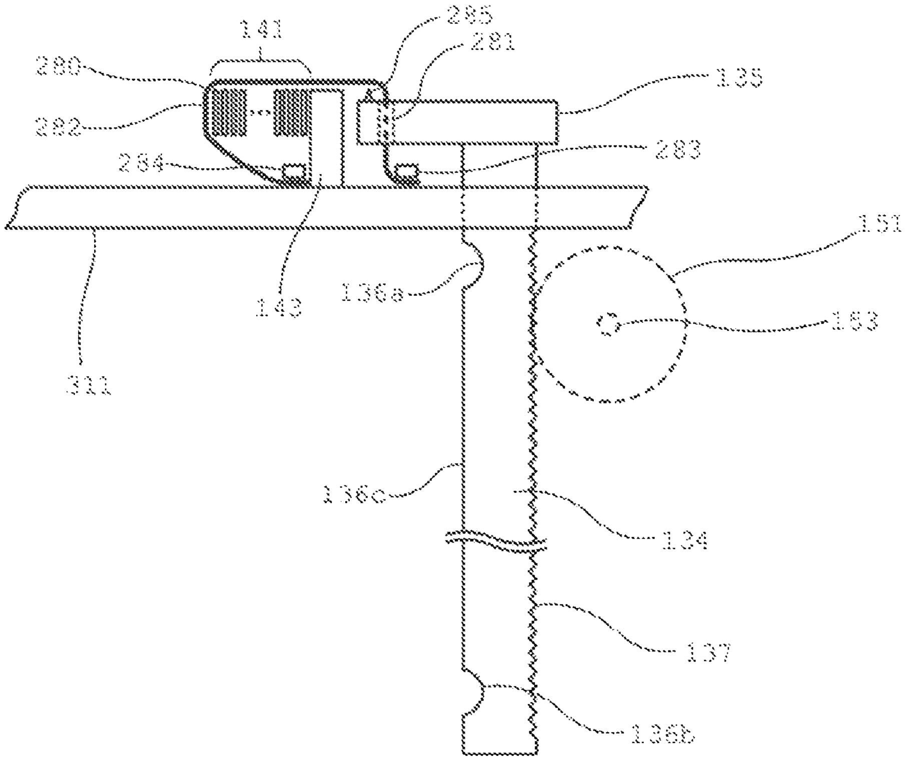

[FIG. 14B]
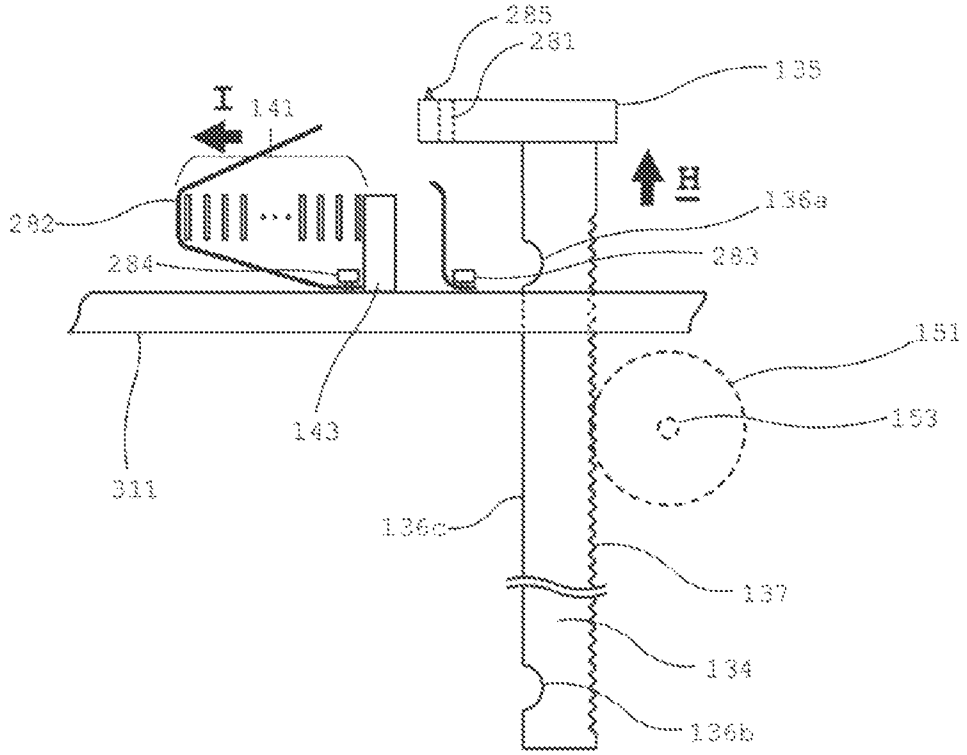

ANTENNA APPARATUS AND SPACECRAFT

CROSS-REFERENCE TO RELATED APPLICATIONS

This is the U.S. National Stage of International Application No. PCT/JP2019/016674, filed Apr. 18, 2019, the disclosure of which is incorporated herein by reference in its entirety for all purposes as if set forth fully herein.

TECHNICAL FIELD

The present disclosure relates to an antenna apparatus and spacecraft including a radiator, a main-reflector, and a sub-reflector.

BACKGROUND ART

Conventionally, as an antenna apparatus mounted in spacecraft such as an artificial satellite, there has been known an antenna apparatus that reflects a radio wave radiated from a radiator by using a sub-reflector, reflects the reflected radio wave again by using a main-reflector, and, for example, emits the radio wave toward a ground station of the earth (Patent Document 1) Also, as represented by a reflector for a portable antenna or satellite-mounted antenna, a main-reflector having a shape larger than that of a sub-reflector is compactly stored during transportation and when not in use, and is deployed to be used for communication when in use. For example, Patent Document 2 describes that in a deployable antenna that supports a cable network functioning as an antenna reflection surface with a deployable truss, the deployable truss can be stored and deployed by using a slide hinge.

However, the antenna apparatus of Patent Document 2 requires an expansion tube and a gas supply device when the antenna apparatus is deployed from a storage of the antenna apparatus.

PRIOR ART DOCUMENTS LIST

Patent Documents
Patent Document 1: JPH09-266408 A
Patent Document 27 JP2005-086698 A

SUMMARY OF INVENTION

Technical Problem

Taking account of the above-described technology, the present disclosure provides an antenna apparatus and spacecraft that can be more easily deployed from a stored state according to various embodiments.

Solution to Problem

According to an aspect of the present disclosure, there is provided "an antenna apparatus, comprising: a main-reflection unit including a plurality of ribs formed to be deployable in a stored state in which the ribs are folded and a sheet body provided between a plurality of the ribs and configured to be capable of reflecting a radio wave radiated from a radiator and emitting the radio wave outside; and a restriction member configured to restrict deployment of the plurality of ribs in the stored state, and release the restriction by operation of a restriction release member different from the main-reflection unit."

According to another aspect of the present disclosure, there is provided "spacecraft comprising the antenna apparatus described above".

Advantageous Effects of Invention

According to various embodiments of the present disclosure, it is possible to provide an antenna apparatus and spacecraft that can be more easily deployed from a stored state.

Additionally, the effects described above are merely examples for convenience of description, and are not limited. In addition to or instead of the effects described above, any effects described in the present disclosure or effects obvious to those skilled in the art can be exhibited.

BRIEF DESCRIPTION OF DRAWINGS

FIG. 1 is a view illustrating a configuration of spacecraft 1 according to a first embodiment of the present disclosure.

FIG. 2 is a block diagram illustrating a configuration of spacecraft 1 according to a first embodiment of the present disclosure.

FIG. 3A is a view illustrating a configuration of a reflection unit 120 of spacecraft 1 when being deployed according to a first embodiment of the present disclosure.

FIG. 3B is a view illustrating a configuration of a reflection unit 120 of spacecraft 1 when being stored according to a first embodiment of the present disclosure.

FIG. 4 is a view illustrating a configuration of a cross section of a sub-reflection unit 122 and a main body 300 when a reflection unit 120 of spacecraft 1 is stored according to a first embodiment of the present disclosure.

FIG. 5 is a view illustrating a configuration of a delivery device 150 according to a first embodiment of the present disclosure.

FIG. 6A is a diagram conceptually illustrating an operation of a delivery device 150 according to a first embodiment of the present disclosure.

FIG. 6B is a diagram conceptually illustrating an operation of a delivery device 150 according to a first embodiment of the present disclosure.

FIG. 6C is a diagram conceptually illustrating an operation of a delivery device 150 according to a first embodiment of the present disclosure.

FIG. 7 is a diagram conceptually illustrating an arrangement position of a sub-reflection unit 122 according to a first embodiment of the present disclosure.

FIG. 8A is a view illustrating an attachment structure of a rib 141 and a hub 143 according to a first embodiment of the present disclosure.

FIG. 8B is a view illustrating a folding structure of a rib 141 according to a first embodiment of the present disclosure.

FIG. 9 is a view illustrating a folding structure of a rib 141 according to a first embodiment of the present disclosure.

FIG. 10 is a view illustrating a configuration of a restriction member 182 according to a first embodiment of the present disclosure.

FIG. 11A is a diagram conceptually illustrating a restriction state of a rib 141 according to a first embodiment of the present disclosure.

FIG. 11B is a diagram conceptually illustrating a restriction state of a rib 141 according to a first embodiment of the present disclosure.

FIG. 12 is a diagram illustrating a processing sequence of each of devices in spacecraft 1 according to a first embodiment of the present disclosure.

FIG. 13 is a diagram conceptually illustrating an operation of a delivery device 250 according to a second embodiment of the present disclosure.

FIG. 14A is a diagram conceptually illustrating a restriction state of a rib 141 according to a third embodiment of the present disclosure.

FIG. 14B is a diagram conceptually illustrating a restriction state of a rib 141 according to a third embodiment of the present disclosure.

DESCRIPTION OF EMBODIMENTS

Various embodiments of the present disclosure will be described with reference to the accompanying drawings. Additionally, common elements in the drawings are denoted by a same reference sign.

First Embodiment

1. Configuration of Spacecraft 1

FIG. 1 is a diagram illustrating a configuration of spacecraft 1 according to a first embodiment of the present disclosure. According to FIG. 1, the spacecraft 1 includes: a main body 300 in which a control unit controlling navigation of the spacecraft 1 itself and controlling operation and an orientation of the spacecraft 1 or the like is mounted; a power supply unit 200 supplying power for driving various elements including the main body 300 and a radiator 110 in space; and a communication unit 100 for performing transmission and reception of information and performing transmission and reception of an observation radar between the spacecraft 1 and the ground or other spacecraft.

FIG. 2 is a block diagram illustrating a configuration of the spacecraft 1 according to the first embodiment of the present disclosure. The spacecraft 1 does not need to include all of the elements illustrated in FIG. 2, and can have a configuration in which a part of the spacecraft 1 is omitted, or other elements can be added. For example, the spacecraft 1 can also be provided with a plurality of the power supply units 200 and/or a plurality of the communication units 100.

According to FIG. 2, the spacecraft 1 includes: the main body 300 that includes a computer 301 including a memory 310 and a processor 320 and a sensor 330; the power supply unit 200 that includes a power supply control circuit 210, a battery 220, and a solar panel 230; and the communication unit 100 that includes a communication control circuit 170, a transmitter 171, a receiver 172, the radiator 110, and a reflection unit 120. These elements are electrically connected to each other via a control line and a data line.

Various elements and parts including the computer 301 and various sensors are mounted in the main body 300 in order to control a flight, communication, and the like of the spacecraft 1. Among these, the computer 301 functions as a control unit controlling other elements and parts, and an on board computer is used as an example of the computer 301. The on-board computer includes the memory 310 and the processor 320. Additionally, the on-board computer is an example of the computer 301, and the computer 301 may be any computer such as a processor and a microcomputer capable of controlling other elements and parts.

The memory 310 includes a RAM, a ROM, a nonvolatile memory, an HDD, and the like, and functions as a storage unit. The memory 310 stores, as a program, instructions for controlling the spacecraft 1 according to the present embodiment in various manners. As an example, the memory 310 appropriately stores: an image of an outside of the spacecraft 1, which is captured by a camera (not illustrated); an observation value obtained by using the communication unit 100 as a radar, information received from the ground station via the communication unit 100 or information transmitted to the ground station via the communication unit 100; detection information obtained by the sensor 330 necessary for controlling the orientation and travel of the spacecraft 1; and a program for deploying the reflection unit 120 of the communication unit 100, and the like.

The processor 320 functions as a control unit that controls the spacecraft 1 on the basis of the program stored in the memory 310. Specifically, the processor 320 controls the power supply unit 200, the communication unit 100, the sensor 330, and the like on the basis of the program stored in the memory 310. As an example, the processor 320 performs, generation of information for performing transmission to the ground station or other spacecraft via the communication unit 100; control related to the observation performed by using the communication unit 100 as a radar; and control for deploying the reflection unit 120 of the communication unit 100.

As an example, the sensor 330 can include a gyro sensor, an acceleration sensor, a position sensor, a velocity sensor, a fixed star sensor, and the like, which are necessary for controlling the travel and orientation of the spacecraft 1, a temperature sensor, an illuminance sensor, an infrared sensor, and the like, which are for observing an external environment of the spacecraft 1, and a temperature sensor and an illuminance sensor, and the like, which are for measuring an internal environment of the spacecraft 1. The detected information and data are appropriately stored in the memory 310, used for control by the processor 320, and transmitted to a base station on the ground via the communication unit 100.

The power supply unit 200 includes the power supply control circuit 210, the battery 220, and the solar panel 230, and functions as a power supply unit. The power supply control circuit 210 is connected to the battery 220 and controls charging and discharging of power of the battery 220. Under the control by the power supply control circuit 210, the battery 220 charges power generated by the solar panel 230 and accumulates the power to be supplied to each of drive systems such as the computer 301 and the communication unit 100 in the main body 300.

The communication unit 100 includes the communication control circuit 170, the transmitter 171, the receiver 172, the radiator 110, and the reflection unit 120, and functions as a communication unit. The communication control circuit 170 performs processing such as modulation and demodulation in order to transmit and receive information to and from the ground station or other spacecraft via the connected radiator 110. The modulated signal is converted into a radio frequency having a high frequency in the transmitter 171, and then is amplified, and emitted to a reflection surface of the reflection unit 120 via the radiator 110. In the present embodiment, the high frequency signal emitted from the radiator 110 is once reflected by a sub-reflector 131 of a sub-reflection unit 122 and emitted to the outside by the main-reflector of a main-reflection unit 121. On the other hand, the high frequency signal received from the outside is received by the receiver 172 through a reverse path, and demodulated by the communication control circuit 170. Additionally, the reflection unit 120 is compactly stored when transportation or when not in use, and is deployed when in use.

In the present embodiment, only the communication unit 100 including a pair of the sub-reflection unit 122 and the main-reflection unit 121 will be described. The communication unit 100 can adjust a communication frequency of a frequency band of 8 GHz or less or 8 GHz to 12 GHz band (so-called X band), a communication frequency of a 12 GHz to 18 GHz band (so-called Ku band), a communication frequency of a millimeter wave band of 30 GHz or more, a communication frequency of a sub-millimeter wave band of 300 GHz or more, and the like as desired. The communication unit 100 can be used as a communication antenna for communicating with the ground station or other spacecraft, for example, as an observation radar for weather, rainfall, military use, or the like, and use thereof is not limited.

2. Configuration when Antenna Apparatus 10 is Deployed

In the present embodiment, the reflection unit 120 is compactly stored when not in use at the time of transportation or launch, and is deployed in a case of being used in space. FIG. 3A is a view illustrating a configuration of the reflection unit 120 of the spacecraft 1 when being deployed according to the first embodiment of the present disclosure.

(Overall Configuration)

First, according to FIG. 3A, the spacecraft 1 according to the present embodiment includes an antenna apparatus 10 including, at least: the reflection unit 120 including the main-reflection unit 121 and the sub-reflection unit 122; the radiator 110; and a delivery device 150. Specifically the antenna apparatus 10 includes: the radiator 110; the sub-reflection unit 122 that is disposed to face the radiator 110 at a predetermined angle and reflects a radio wave emitted from the radiator 110 to the main-reflector of the main-reflection unit 121; the main-reflector of the main-reflection unit 121, which is disposed to face the sub-reflector 131 of the sub-reflection unit 122 and further reflects the radio wave reflected by the sub-reflector 131 to emit the radio wave to the outside: a support rod 132 that supports the sub-reflector 131: and the delivery device 150 that delivers the sub-reflector 131 in accordance with deployment of the main-reflector. The antenna apparatus 10 is installed in the spacecraft 1 by fixing a hub 143 to a pedestal 315 of the spacecraft 1.

(Main-Reflection Unit 121)

The main-reflector firming the main-reflection unit 121 includes a plurality of ribs 141, a sheet bod 148, and the like. The reflection surface of the main-reflection unit 121 is formed in a parabolic shape in order to function as a main-reflection mirror as described above.

The hub 143 is provided at an antenna axis X (also referred to as a central axis X of the hub 143) at a center of the antenna apparatus 10. As an example, the hub 143 is formed in a columnar shape by a dielectric such as plastic or a metal such as titanium or stainless steel. The hub 143 is provided with a rib attachment portion 146 on an outer circumferential surface of the hub 143, and a plurality of the ribs 141 are radially arranged at predetermined intervals. The hub 143 is formed to have a substantially circular shape in cross section as a whole. Additionally, the shape of the cross section is not limited to a circular shape, and may be an elliptical shape or a polygonal shape.

The rib 141 includes a plurality of ribs 141-1 to 141-*n*. Each of the ribs 141 is radially arranged on an outer circumference of the hub 143 at predetermined intervals around the hub 143. An upper surface of each of the ribs 141 on a side serving as a reflection mirror surface is formed in a parabolic shape. The sheet body 148 is provided on the upper surface formed in the parabolic shape. As an example, the rib 141 is a spring member formed of stainless spring steel or a composite material such as glass fiber reinforced plastics (GFRP) or carbon fiber reinforced plastics (CFRP), and has elasticity.

Additionally, in the present embodiment, the ribs 141 include a total of 24 ribs. However, the number of the ribs 141 can be chanted regardless of an even number or an odd number according to an area of the deployable antenna at the time of deployment, a material and strength of the ribs to be used, and the like. Furthermore, in the present embodiment, the ribs 141 are disposed at predetermined intervals. However, all of the ribs 141 may be disposed at constant intervals, and may be disposed at partially dense intervals, or may be disposed at irregular intervals.

In the present embodiment, the ribs 141 have elasticity in order to be deployed from a state of being folded and stored. However, the present disclosure is not limited to this, and a plurality of the ribs may be combined by a hinge or the like, folded using the hinge at the time of being stored, and deployed by driving a motor or the like at the time of the development. Furthermore, the ribs 141 may be stored and deployed by combining a material having elasticity and the hinge.

The sheet body 148 forming the main-reflector together with the ribs 141 is provided between a pair of the ribs 141 adjacent to each other. The sheet body 148 is formed of a material capable of reflecting the radio wave to have a parabolic shape as a whole. As an example, the sheet body 148 is formed with a metal network (metal mesh) formed of molybdenum, gold, or a combination thereof. In the present embodiment, in the sheet body 148, substantially triangular metal meshes are prepared according to the number of the ribs 141, and the metal meshes are coupled to be provided on upper surfaces of the ribs 141 formed in the parabolic shape.

Here, in the present embodiment, the sheet body 148 does not have substantially a large tensile force in a direction toward the central axis X of the hub 143, but has a constant tensile force in a direction perpendicular to the direction toward the central axis X. Therefore, in a case where the ribs 141 are deployed and the main-reflector of the main-reflection unit 121 is completely opened, the adjacent ribs 141 are pulled against each other by the tensile force, so that the interval between the adjacent ribs 141 can be maintained.

Furthermore, in the present embodiment, as the sheet body 148, one sheet body 148 is provided between a pair of the ribs 141 adjacent to each other. However, one sheet body 148 does not necessarily need to be provided between a pair of the ribs 141, and may be provided over three or more continuous ribs 141. Furthermore, a predetermined fold mark may be provided to the sheet body 148 in advance in order to further ensure reproducibility of a folded shape.

(Sub-Reflection Unit 122)

The sub-reflection unit 122 includes a sub-reflector 131 disposed to face the main-reflector of the main-reflection unit 121 and the support rod 132 for disposing the sub-reflector 131 to be spaced from the radiator 110 by a predetermined distance.

Similarly to the sheet body 148 of the main-reflector of the main-reflection unit 121, the sub-reflector 131 is made of a material capable of reflecting the radio wave to have a quadratic surface shape as a whole toward the surface of the main-reflector of the main-reflection unit 121. Also, the sub-reflector 131 reflects the radio wave radiated from the radiator 110 toward the main-reflector of the main-reflection unit 121. Therefore, the sub-reflector 131 is disposed to be spaced from the radiator 110 and the main-reflector by a predetermined distance.

Here, FIG. 7 is a diagram conceptually illustrating an arrangement position of the sub-reflection unit 122 according to the first embodiment of the present disclosure. Specifically, FIG. 7 is a diagram of a case where the arrangement position of the sub-reflection unit 122 is applied to an example of the Cassegrain type parabola. As is clear from this drawing, the sub-reflection unit 122 is disposed to be spaced from the radiator 110 and the main-reflector by a distance by which the radiated radio wave can be reflected to the main-reflector and emitted to the outside from the main-reflector. Specifically, a paraboloid of revolution of which a focal point is T is formed in the main-reflector of the main-reflection unit 121, and a hyperboloid of revolution of which focal points are T and T' is formed in the sub-reflector 131 of the sub-reflection unit 122. In order to share the focal point T in this manner, a Cassegrain antenna is formed by installing the radiator 110 at T'. That is, the sub-reflector 131 is disposed at a position in which the focal point T is confocal with respect to the main-reflector having the paraboloid of revolution of the focal point T. Furthermore, the sub-reflector 131 is the hyperboloid of revolution with the focal points T and T', and the radiator 110 is disposed at a position of the focal point T'. Additionally, in a case where it is desired to emit a parallel wave from the main-reflector to the outside, it is as described above, but in a case where it is desired to emit a radio wave distorted by a desired angle, for example, in a case where an elliptical wave is emitted from the main-reflector a position of the sub-reflector 131 can be disposed at a position in which a position from the confocal point T and a position from the radiator 110 are appropriately shifted on a line connecting a center of a curved surface of the main-reflector and a center of a curved surface of the sub-reflector 131.

The support rod 132 is disposed in order to dispose the sub-reflector 131 of the sub-reflection unit 122 to be spaced from the radiator 110 and the main-reflection unit 121 by a predetermined distance. The support rod 132 includes a first support rod 133 having one end connected to the sub-reflector 131 and the other end connected to a joint 135, and a second support rod 134 having one end connected to the joint 135 and the other end released. The sub-reflector 131 connected to one end of the first support rod 133 is supported by the first support rod 133 and the second support rod 134. The support rod 132 includes one or more rods to support the sub-reflector 131. In the example of FIG. 3A, three pairs of the support rods 132 (one is covered by the back surface and not shown) are disposed at equal intervals. Additionally, in the example of FIG. 3A, it has been described that the first support rod 133 and the second support rod 134 form a pair. However, the present disclosure is not limited to this, and the number of the second support rods 134 may be reduced or increased with respect to the first support rod 133. Additionally, delivery of the second support rod 134 will be described in detail in FIGS. 6A to 6C, and the like.

In the present embodiment, when the antenna apparatus 10 is deployed, the support rod 132 is delivered by the delivery device 150 by a predetermined distance. According to this, the support rod 132 is moved such that an arrangement position of the sub-reflector 131 supported by the support rod 132 is disposed at a predetermined position. Therefore, the sub-reflection unit 122, of which a part is stored inside the main body 300 at the time of the storage, is configured so as to be gradually exposed to the outside of the main body 300 by driving the delivery device 150.

(Delivery Device 150)

The delivery device 150 is disposed inside the main body 300 and movably supports the second support rod 134 of the sub-reflection unit 122. By movably supporting the sub-reflection unit 122, the delivery device 150 moves a position of the sub-reflection unit 122 of which at least a part is stored inside the main body 300 until the position becomes a position in which the radio wave radiated from the radiator 110 can be reflected to the main-reflection unit 121 and emitted to the outside from the main-reflection unit 121. In the present embodiment, the delivery device 150 delivers the sub-reflection unit 122 to the position described above by using a rack gear provided on the second support rod 134 and a pinion gear provided on the delivery device 150 so as to mesh with the rack gear, and the details thereof will be described with reference to FIGS. 6A to 6C, and the like.

3. Configuration when Antenna Apparatus 10 is Stored

FIG. 3B is a view illustrating a configuration of the reflection unit 120 of the spacecraft 1 when being stored according to the first embodiment of the present disclosure. Additionally, in the present embodiment, an outer surface of the main body 300 is covered with the solar panel 230 of the power supply unit 200, but in FIG. 3B, a part of the solar panel 230 is omitted in order to describe the inside of the main body 300. Furthermore, in the present embodiment, a plurality of the ribs 141 are folded about the hub 143, but the ribs 141 are omitted in FIG. 3B.

In the present embodiment, at least a part of the sub-reflection unit 122 is accommodated and disposed inside the main body 300 when being stored such as the time of the transportation or the launch. According to this, the sub-reflection unit 122 itself can be compactly accommodated, and the entire antenna apparatus 10 can be stored more compactly.

Specifically, the sub-reflection unit 122 is disposed such that the joint 135 connecting the first support rod 133 with the second support rod 134 is positioned so as to be substantially in contact with the hub 143 fixed to the pedestal 315 of the main body 300. Therefore, the second support rod 134 having one end connected to a lower portion of the joint 135 is accommodated inside the main body 300. Furthermore, the sub-reflector 131 and the first support rod 133 are disposed at position closer to the main body 300 side unlike the predetermined position at the time of use.

Furthermore, in the present embodiment, the ribs 141 (not illustrated) are folded about the hub 143. On the other hand, the ribs 141 have elasticity and are biased in a deploying direction in the (bided and stored state. Therefore, a restriction mechanism 180 for performing restriction such that the folded ribs 141 are not deployed in the stored state is provided. Details of an operation of the restriction mechanism 180 will be described with reference to FIGS. 11A and 11B, and in the present embodiment, the sub-reflector 131 of the sub-reflection unit 122 is moved by the delivery device 150 such that the restriction for the ribs is released. When the restriction is released, the ribs 141 are deployed by the elasticity of the ribs. That is, in the present embodiment, the sub-reflection unit 122 functions as a restriction release member. Additionally, only four restriction mechanisms 180 are illustrated in FIG. 3B, but in the present embodiment, the restriction mechanisms 180 are provided corresponding to the ribs 141, respectively. Therefore, in FIG. 3B, the remaining restriction mechanisms 110 are omitted.

Additionally, in the present embodiment, since the radiator 110 is not connected to the sub-reflection unit 122 such as the joint 135 even in the stored state, a position of the radiator 110 is the same as that at the time of the deployment. However, high positional accuracy is required for a distance between the radiator 110 and the sub-reflector 131. In a case where there is a sufficient space for accommodating the radiator 110 inside the main body 300, the radiator 110 may be capable of being accommodated inside the main body 300 at the time of the storage by moving the radiator 110 together with the sub-reflection unit 122.

4. Cross-Sectional Configuration when Antenna Apparatus 10 is Stored

FIG. 4 is a view illustrating a configuration of a cross section of the sub-reflection unit 122 and the main body 300 when the reflection unit 120 of the spacecraft 1 is stored according to the first embodiment of the present disclosure. In the present embodiment, a plurality of the ribs 141 are folded about the hub 143, but the ribs 141 are omitted in FIG. 4. According to FIG. 4, inside the curved surface of the sub-reflector 131, a plurality of ribs 131*a* for maintaining the curved surface of the sub-reflector 131 are provided. Furthermore, the curved surface of the sub-reflector 131 and one end of each first support rod 133 are fixed by a joint 138. A known joint such as a screw and a screw hole can be used as the joint 138.

The first support rod 133 and the second support rod 134 are fixed to each other via the joint 135. The joint 135 may have any shape, but is desirably formed by one flat plate or a donut-shaped flat plate in order to more accurately position the support rod 132. Also, in the stored state, the joint 135 is disposed at a position inside the hub 143 formed in a hollow shape.

FIG. 4 illustrates a cross section of the main body 300 at the time of the storage. Accordingly, the second support rod 134 of the sub-reflection unit 122 is inserted into a through hole 313 formed in a top plate 311 of the main body 300 and a through hole 314 formed in a middle plate 312 of the main body 300.

Furthermore, the delivery device 150 for delivering the second support rod 134 to the outside of the main body 300 is fixed to the top plate 311 of the main body 300. Furthermore, a first sensor device 156 for detecting start and end of the delivery of the second support rod 134 by the delivery device 150 is fixed to the top plate 311 of the main body 300.

As described above, the ribs 141 (not illustrated) are folded about the hub 143 at the time of the storage. The restriction mechanism 180 for performing restriction such that the folded ribs 141 are not deployed in the stored state is provided. Additionally, only one restriction mechanism 180 is illustrated in FIG. 4, but in the present embodiment, the restriction mechanisms 180 are provided corresponding to the ribs 141, respectively. Therefore, in FIG. 4, the remaining restriction mechanisms 180 are omitted.

5. Configuration of Delivery Device 150

FIG. 5 is a view illustrating a configuration of the delivery device 150 according to the first embodiment of the present disclosure. According to FIG. 5, a pinion gear 137 is formed on one side of a long side of the second support rod 134 firmed in a long shaft shape. According to this, the second support rod 134 functions as a movable shaft for delivering the entire sub-reflection unit 122 to the outside of the main body 300 by rotation of a separately provided rack gear. One end of the second support rod 134 is connected to the first support rod 133 by the joint 135. The other end of the second support rod 134 is not directly fixed to other elements or the like, but is an open end. However, in order to suppress vibration of the sub-reflection unit 122 in the stored state of the antenna apparatus 10, a first stopper 136*d* is disposed at the other end of the second support rod 134. As an example, the first stopper 136*d* is formed in a protrusion shape from the other end of the second support rod 134, and is fitted to a second stopper 317 fixed to a bottom plate 316 of the main body 300 with a screw 318 and formed in a recess shape. According to this, the second support rod 134 is prevented from being swung right and left by the vibration or the like. Additionally, the first stopper 136*d* and the second stopper 317 are formed in the protrusion shape or the recess shape, but the shapes may be opposite to each other. Furthermore, the present disclosure is not limited to this, and positioning may be performed by another positioning method such as a magnet.

According to FIG. 5, the delivery device 150 for delivering the second support rod 134 to the outside of the main body 300 includes: at least a rotation mechanism 151 including a rack gear fitted to the pinion gear 137 of the second support rod 134; a motor 152 for rotating the rotation mechanism 151 about a rotation shaft 153: and the first sensor device 156 for detecting a delivery position of the second support rod 134. The motor 152 functioning as a drive unit of the rotation mechanism 151 is fixed to the top plate 311 of the main body 300. Also, the rotation shaft 153 of the motor 152 is rotated to rotate the rotation mechanism 151 fixed to the rotation shaft 153. The rack gear is formed on the outer circumference of the rotation mechanism 151, and teeth of the tear are fitted to the teeth of the pinion gear 137 of the second support rod 134.

Furthermore, the first sensor device 156 of the delivery device 150 is disposed on a side on which the pinion gear is not provided in the long side of the second support rod 134, and is fixed to the top plate 311 of the main body 300. The first sensor device 156 has a protrusion 155 that is constantly biased in a direction perpendicular to the second support rod 134 and is formed slidably in the direction. The protrusion 155 comes into contact with a recessed groove 136*a* of the second support rod 134 before the delivery of the sub-reflection unit 122 is started. On the other hand, when the sub-reflection unit 122 is delivered, in order to move the second support rod 134, the protrusion 155 comes into contact with the long side of the side on which the pinion gear of the second support rod 134 is not provided. When the sub-reflection unit 122 reaches a predetermined position, the protrusion 155 comes into contact with the recessed groove 136*b* of the second support rod 134. The first sensor device 156 detects the start and end of the delivery of the sub-reflection unit 122 by detecting a change in a state of the protrusion 155 by using a switch 154 disposed inside the first sensor device 156. Additionally, the recessed groove 136*a* and a recessed groove 136*b* function as a delivery start and end detection mechanisms, respectively.

6. Details of Configuration and Operation of Delivery Device 150

FIGS. 6A to 6C are diagrams conceptually illustrating an operation of the delivery device ISO according to the first embodiment of the present disclosure. Specifically, FIG. 6A illustrates a state in which the antenna apparatus 10 is stored and a state before the delivery of the sub-reflection unit 122 is started. Furthermore, FIG. 6B illustrates a state in which the antenna apparatus 10 is deployed and the sub-reflection unit 122 is being delivered. Furthermore, FIG. 6C illustrates a state in which the deployment of the antenna apparatus 10 is completed and the delivery of the sub-reflection unit 122 is completed.

According to FIG. 6A, before the deliver of the sub-reflection unit 122 is started, the rotation mechanism 151 is not rotated, and the second support rod 134 is also in an initial position. The protrusion 155 of the first sensor device 156 is constantly biased in a direction of the second support rod 134, and the biasing causes the protrusion 155 to come into contact with the recessed groove 136_a_ of the second support rod 134. Therefore, the switch 154 is maintained to be in an OFF state.

Next, according to FIG. 6B, in order to deploy the antenna apparatus 10, the rotation mechanism 151 starts rotating about the rotation shaft 153 in the delivers direction of the second support rod 134, that is, a direction of an arrow D. Then, the rack gear formed on a surface of the rotation mechanism 151 and the pinion gear 137 formed on the second support rod 134 are fitted to each other, and the second support rod 134 is delivered in a direction of an arrow F with the rotation of the rotation mechanism 151. At this time, the protrusion 155 biased in the direction of the second support rod 134 and coming into contact with the recessed groove 136_a_ is pushed in a direction toward the inside of the first sensor device 156, that is, in a direction of an arrow E by a side 136_c_ of the second support rod 134 on which the recessed groove 136_a_ is provided. According to this, the switch 154 is switched to an ON state, and it is detected that the delivery of the second support rod 134 is started. Additionally, in the present embodiment, the switch 154 is constantly in the ON state while the second support rod 134 is delivered.

Next, according to FIG. 6C, when the second support rod 134 is delivered by the rotation of the rotation mechanism 151 and the sub-reflector 131 connected to the second support rod 134 reaches a predetermined position, the protrusion 155 of the first sensor device 156 comes into contact with the recessed groove 136_b_ formed in advance corresponding to the position. Then, the protrusion 155 biased in the direction of the second support rod 134 is moved in the direction of the second support rod 134, that is, a direction of an arrow G. According to this, the switch 154 of the first sensor device 156 is switched to an OFF state, and it is detected that the delivery of the second support rod 134 is ended. When the first sensor device 156 detects that the delivery of the second support rod 134 is ended, the processor 320 transmits a rotation end signal to the motor 152 that drives the rotation mechanism 151. According to this, the rotation of the rotation mechanism 151 is stopped, and the delivery of the second support rod 134 is also ended.

7. Attachment Structure and Folding Structure of Rib 141

FIG. 8A is a view illustrating an attachment structure of the rib 141 and the hub 143 according to the first embodiment of the present disclosure. Additionally, in FIG. 8A, for convenience of explanation, the attachment structure of one rib 141-1 among a plurality of the ribs 141 and the hub 143 is illustrated, but the other ribs 141-2 to 141-_n_ are also attached to the huh 143 with the same attachment structure.

The hub 143 has an inner circumferential surface 143_b_ formed in a columnar shape and an outer circumferential surface 143_a_ formed in a polygonal column shape (for example, column having 24 corners). The outer circumferential surface 143_a_ has the rib attachment portion 146 formed in a planar shape in accordance with the number of ribs 141 to be attached A plurality of rib attachment holes 144 (for example, one rib attachment hole 144 has four holes) disposed at predetermined intervals are formed on the rib attachment portion 146. A hole position of the rib attachment hole 144 corresponds to a hole position of an attachment hole 145 of an end portion 142_a_ of the rib 141, and the rib 141 and the outer circumferential surface 143_a_ of the hub 143 are fixed from the outside of the rib 141 by a bolt or the like (not illustrated). In the present embodiment, each rib attachment hole 144 is provided in the rib attachment portion 146 formed in a planar shape on the outer circumferential surface 143_a_. Also, an inner side surface of the rib 141 on the end portion 142_a_ side is fixed along the plane surface of the rib attachment portion 146.

In the present embodiment, the rib 141 is fixed along an outer circumference of the hub 143, specifically, along a planar rib attachment portion 146. However, the rib 141 may be fixed along the outer circumference of the hub 143, specifically, along a tangent of a circumscribed circle of the outer circumferential surface 143_a_ of the hub 143. Furthermore, in the present embodiment, a member such as a hinge is not used, but a hinge may be installed in each rib attachment portion 146 and the rib 141 may be fixed to the hinge.

Furthermore, in FIG. 8A, an example in which 24 ribs 141 are fixed will be described. Therefore, corresponding to the 24 ribs 141, the hub 143 is formed in substantially a shape having 24 corners and includes 24 rib attachment portions 146. However, the present disclosure is not limited to this, and the different number of ribs 141 can be used or the different number of rib attachment portions 146 can be used.

FIG. 8B is a view illustrating the folding structure of the rib 141 and the hub 143 according to the first embodiment of the present disclosure. Additionally, in FIG. 8B, for convenience of explanation, the folding structure of the ribs 141-1 and 141-2 among a plurality of the ribs 141 is illustrated, but the other ribs 141-3 to 141-_n_ are also applied in a similar manner.

In the present embodiment, the ribs 141-1 and 141-2 are folded so as to be wound from the end portion 142_a_ toward a distal end portion 142_b_ along the outer circumference of the hub 143. Here, each of the ribs 141-1 and 141-2 is fixed along the outer circumference of the hub 143 (FIG. 8A) Therefore, large stress due to the folding is not generated at the end portion 142_a_ of the rib 141, and the rib can be stably stored. Furthermore, the rib 141 is folded such that the distal end portions 142_b_ are positioned at the same height as or substantially the same height as the end portions 142_a_ of the ribs 141-1 and 141-2, that is, folded in a spiral shape (state in which the rib 141 is wound in a state in which there is not or almost not component in a direction perpendicular to a rotation surface formed by the rib 141). At this time, since the rib 141 has elasticity, the rib 141 is biased in a direction in which the rib 141 is deployed, that is, in a direction of an arrow A in the folded and stored state. Therefore, as described with reference to FIGS. 9, 11A, and 11B, in the present embodiment, the restriction mechanism 180 restricts the deployment of the rib 141 at the time of the storage.

FIG. 9 is a view illustrating the folding structure of the rib 141 according to the first embodiment of the present disclosure. Specifically, FIG. 9 is a top view of the spacecraft 1 when the antenna apparatus 10 is stored. Additionally, the sub-reflector 131, an upper side of the first support rod 133, the radiator 110, a part of the rib 141, and the like are omitted for convenience of description. According to FIG. 9, each rib 141 is fixed to each rib attachment portion 146 provided on the outer circumference of the hub 143. Furthermore, each rib 141 has elasticity in a deploying direction, that is, in a direction of an arrow B. At the time of the storage, it is wound along the outer circumference of the hub 143 against this elastic force and folded. Therefore, it is desirable that the restriction mechanism 180 for performing restriction such that the hub 143 is not deployed is provided corresponding to each rib 141 or each rib attachment portion 146 at the time of the storage. Accordingly, in the present embodiment, since 24 ribs are used, 24 restriction mechanisms 180 are also provided, but in FIG. 9, only three restriction mechanisms are illustrated and the others are omitted for convenience of description. Additionally, the number of the restriction mechanisms 180 is not necessarily required to correspond to the number of the ribs 141 or the number of the rib attachment portions 146, and can be appropriately adjusted in accordance with rigidity of the restriction member.

The restriction mechanism 180 includes a restriction member 182 (182-1 to 182-*n*) and a pin 181 (181-1 to 181-*n*) for locking the restriction member 182. Since one end of the restriction member 182 is fixed to the top plate 311 of the main body 300 or the hub 143 in the stored state, the one end of the restriction member 182 does not come off from the top plate 311 or the hub 143 even after the deployment. On the other hand, the other end is locked to the pin 181 provided in the joint 135 of the sub-reflection unit 122. The other end of the restriction member 182 is only required to be capable of being locked to the pin 181 by any means, and any member having a plate shape, a rod shape, or the like can be used. Among them, it is desirable that as the shape of the restriction member 182, an elongated member having a string shape, a rod shape, or a wire shape is used in consideration of ease of restriction after the folding. Furthermore, as a property of the restriction member 182, a member having softness or flexibility is desirable. As an example of the material of the restriction member 182, any one of inorganic fiber such as a carbon fiber, a glass fiber, and a basalt fiber, a metallic fiber such as a steel fiber and a stainless fiber, and an organic fiber such as an aramid fiber, a vinylon fiber, and a polyethylene fiber, or a combination thereof may be used. Furthermore, in addition to these fiber materials, materials such as various organic materials, stainless steel, steel, tungsten, titanium, phosphor bronze, brass, and the like can be appropriately combined and used.

In the present embodiment, after the rib 141 is folded along the outer circumference of the hub 143, the restriction member 182 restricts the deployment of the rib 141 by wrapping the folded rib 141. Therefore, when vibration due to movement is applied, there is a possibility that the restriction member 182 is rubbed by the rib 141 formed in a plate shape and cut. Therefore, in order to prevent this, at least an area of the restriction member 182 in contact with the rib 141 can be coated with a coating member 185. Additionally, as an example of the material of the coating member 185, any one of an inorganic fiber such as a carbon fiber, a glass fiber, and a basalt fiber, a metallic fiber such as a steel fiber and a stainless fiber, and an organic fiber such as an aramid fiber, a vinylon fiber, and a polyethylene fiber, or a combination thereof may be used. Furthermore, in addition to these fiber materials, materials such as various organic materials, stainless steel, steel, tungsten, titanium, phosphor bronze, brass, and the like can be appropriately combined and used.

8. Operation of Restriction Mechanism 180

FIG. 11A is a diagram conceptually illustrating a restriction state of the rib 141 according to the first embodiment of the present disclosure. Furthermore, FIG. 11B is a diagram conceptually illustrating the restriction state of the rib 141 according to the first embodiment of the present disclosure.

Specifically, FIG. 11A is a diagram illustrating a stored state in which the rib 141 is folded along the outer circumference of the hub 143 and the deployment of the rib 141 is restricted by the restriction member 182. According to FIG. 11A, one end of the restriction member 182 is fixed to the top plate 311 of the main body 300 by a screw. Then, the restriction member 182 is wound so as to bundle the rib 141 folded along the outer circumference of the huh 143, passes through a gap formed between an inner surface of the hub 143 and the joint 135 of the sub-reflection unit 122, and the other end thereof is locked to the pin 181. At this time, the restriction member 182 has a locking ring 183 at a distal end of the other end side, and the locking ring 183 is locked so as to be caught by the pin 181.

On the other hand, the second support rod 134 is delivered by the rotation mechanism 151 of the delivery device 150, and the joint 135 for fixing one end of the second support rod 134 and the first support rod 133 (not illustrated) has the pin 181 on the inner surface side of the huh 143. The pin 181 extends from the joint 135 in a direction opposite to the direction in which the joint 135 is delivered by the delivery device 150. Furthermore, a distal end of the pin 181 is inserted into a recess 319 formed on an upper surface side of the top plate 311. According to this, when the locking ring 183 at a distal end of the restriction member 182 is locked, it is difficult for the locking ring to come off.

Additionally, in the present embodiment, one end of the restriction member 182 is fixed to the top plate 311 by a screw. However, the present disclosure is not limited to this, one end of the restriction member 182 may be fixed to any member such as the hub 143, which is not moved by the delivery device 150. Furthermore, one end of the restriction member 182 is fixed, but this one end may be merely locked.

In the present embodiment, the pin 181 is disposed on the joint 135, but the pin 181 may be disposed on other members such as the second support rod 134 and the first support rod 133.

FIG. 11B is a diagram illustrating a state in which the restriction of the deployment by the restriction member 182 is released and the rib 141 is being deployed. According to FIG. 11B, when the motor 152 of the delivery device 150 is driven, the rotation mechanism 151 starts being rotated. Then, the second support rod 134 having the pinion gear 137 with which the rack gear provided on the outer circumference of the rotation mechanism 151 meshes is delivered to the outside of the main body 300, that is, in a direction of an arrow H. According to this, the joint 135, the first support rod 133, and the sub-reflector 131 are moved together. At this time, the pin 181 provided in a direction Opposite to the moving direction from the joint 135 is also moved in a direction of an arrow H along with the movement of the sub-reflector 131 and the joint 135. Therefore, the locking ring 183 of the restriction member 182 locked to the pin 181 is disengaged from the pin 181. That is, in the present embodiment, the sub-reflection unit 122 including the sub-reflector 131 and joint 135 functions, etc as a restriction release member.

On the other hand, the rib 141 is biased in a direction in which the ribs 141 is deployed by its own elasticity, that is, in a direction of an arrow 1. Therefore, when the locking of the restriction member 182 is released, the rib 141 can be deployed by the elasticity of the rib 141 in a direction of the arrow 1. At this time, the restriction member 182 is repelled in a direction of an arrow J by the elastic force of the rib 141, but since the restriction member 182 has flexibility or softness to the extent of being repelled by the elastic force of the rib 141, the deployment of the rib 141 is not hindered.

Additionally, in the present embodiment, the rib 141 having elasticity is used, but it is not necessarily required to have the elasticity. For example, it is also possible to deploy the rib 141 from a state folded using the hinge or the like by using drive force of the motor or the like.

9. Processing Sequence Between Devices of Spacecraft 1

FIG. 12 is a diagram illustrating a processing sequence of each of devices in the spacecraft 1 according to the first embodiment of the present disclosure. Specifically, a processing flow when the delivery device 150 is controlled to deliver the second support rod 134, deliver the sub-reflector 131 to a predetermined position, and deploy the rib 141 of the main-reflection unit 121 by the processor 320 provided in the computer 301, which executes a program stored in the memory 310, is mainly illustrated.

First, the communication unit provided in the spacecraft 1 receives, from the ground station, an unlock signal for releasing the lock for preventing the second support rod 134 from moving due to the vibration. Then, when the lock is released and it is detected that the second support rod 134 can be delivered (S11), a delivery instruction signal T11 is transmitted to the delivery device 150 in order to deliver the second support rod 134.

When the delivery device 150 receives the delivery instruction signal T11, the delivery device 150 turns on the motor 152 and starts driving of the delivery device 150 (S12). Then, the rotation mechanism 151 rotatable connected to the rotation shall 153 of the motor 152 is rotated along with the driving of the delivery device ISO. By the rack gear provided on the outer circumference of the rotation mechanism 151, the second support rod 134 having the pinion gear with which the rack gear meshes is delivered in a direction outside of the main body 300 (S13). At this time, the joint 135 connected to the second support rod 134, the first support rod 133, and the sub-reflector 131 are also moved together. Also, as the sub-reflector 131 is moved, the restriction by the restriction member 182 that restricts the deployment of the rib 141 of the main-reflection unit 121 folded around the huh 143 and stored is released (S14). With the release of the restriction, the main-reflector formed by the ribs 141 having elasticity starts being deployed by the elasticity of the rib 141 itself.

When the second support rod 134 is delivered and the sub-reflector 131 supported by the second support rod 134 and the first support rod 133 reaches a predetermined position, the protrusion 155 of the first sensor device 156 comes into contact with the recessed groove **136*b* of the second support rod 134. According to this, it is detected that the sub-reflector 131 reaches the position and the delivery of the second support rod 134 is ended (S15). In accordance with the detection result, the delivery device 150 transmits a deliver completion signal T12 to the computer 301**.

When the computer 301 receives the delivery completion signal T12 (S16), the computer 301 transmits a motor drive end instruction signal T13 to the delivery device 150. The delivery device 150 which has received the signal turns off the motor 152 and stops the rotation of the rotation mechanism 151 (S17). According to this, the delivery of the second support rod 134 is ended, and the sub-reflector 131 is disposed at a predetermined position.

As described above, in the present embodiment, in a state in which the antenna apparatus 10 is stored, at least a part of the sub-reflection unit 122 is accommodated inside the main body 300, and a portion accommodated outside the main body 300 at the time of the deployment is delivered, and the sub-reflector 131 is disposed at a predetermined position. According to this, in contrast to the related art in which it has been difficult to compactly store the sub-reflection unit 122 by a height of the sub-reflection unit 122, it is possible to store the sub-reflection unit 122 more compactly. Furthermore, by moving the sub-reflector 131 to a predetermined position, the restriction of the rib 141 forming the main-reflection unit 121, of which the deployment has been restricted, is released. Since the restriction is automatically released along with the movement of the sub-reflector 131, it is not necessary to newly add a driving device for releasing the restriction, and the deployment can be performed more easily.

Second Embodiment

In the first embodiment, a case where the rack gear and the pinion gear are used for the delivery device 150 and the second support rod 134 in order to move the sub-reflector 131 has been described. In a second embodiment, a case where a ball screw is used instead of the rack gear and the pinion gear will be described. Additionally, the present embodiment has the same configuration as that of the first embodiment except for the points which will be specifically described below. Therefore, a detailed description of the same configuration will be omitted.

FIG. 13 is a diagram conceptually illustrating an operation of a delivery device 250 according to the second embodiment of the present disclosure. According to FIG. 13, to one end of a second support rod 231 of the sub-reflection unit 122, connected is the first support rod 133 (not illustrated) via the joint 135 (not illustrated) as in the first embodiment. On the other hand, to the other end of the second support rod 231, connected is a nut 232. Furthermore, the second support rod 231 is formed in a hollow shape in order to insert a screw shaft 255 into the second support rod 231.

The nut 232 is fixed to a distal end of the second support rod 231 and has a donut shape having a hole into which the screw shaft 255 is inserted. A groove 233 is firmed on an inner surface of the nut 232 so as to be fitted with a screw thread formed on a surface of the screw shaft 255.

The delivery device 250 includes a motor 253, a rotation shaft 254 of the motor 253, and the screw shaft 255. The delivery device 250 is fixed to the bottom plate 316 of the main body 300. One end of the screw shaft 255 is fixed to the rotation shaft 254 of the motor 253. Therefore, when the motor 253 is driven and the rotation shaft 254 is rotated, the screw shaft 255 is also rotated in the same direction according to the rotation of the rotation shaft 254. The screw shaft 255 is formed in a long columnar shape, and is inserted into the second support rod 231 formed in a hollow cylindrical shape in a state in which the antenna apparatus 10 is stored. Furthermore, the screw thread of the screw shaft 255 is formed on substantially the entire outer circumferential surface of the screw shaft 255 so as to be fitted with the groove 233 of the nut 232.

In the state in which the antenna apparatus 10 is stored, the screw shaft 255 is inserted into the second support rod 231 as described above. After that, the screw shaft 255 is rotated about the rotation shaft 254 as the motor 253 of the delivery device 250 is driven. The second support rod 231 is delivered in a direction outside the top plate 311 of the main body 300 along the screw shaft 255 together with the nut 232 as the screw shaft 255 is rotated. According to this, the second support rod 231 is delivered, and the first support rod 133 and the sub-reflector 131 which are connected to the second support rod 231 are moved to a predetermined position.

Additionally, in the present embodiment, similarly to the first embodiment, the second support rod 231 includes a recessed groove **235*a* and a recessed groove 235*b* with which the protrusion 155 of the first sensor device 156 come into contact. Therefore, similarly to the first embodiment, start of the delivery of the second support rod 231 can be detected by using the recessed groove 235*a*, and end of the delivery of the second support rod 231 can be detected by using the recessed groove 235***b*.

As described above, in the present embodiment, in a state in which the antenna apparatus 10 is stored, at least a part of the sub-reflection unit 122 is accommodated inside the main body 300, and a portion accommodated outside the main body 300 at the time of the deployment is delivered, and the sub-reflector 131 is disposed at a predetermined position. According to this, in contrast to the related art in which it has been difficult to compactly store the sub-reflection unit 122 by a height of the sub-reflection unit 122, but it is possible to store the sub-reflection unit 122 more compactly. Furthermore, by moving the sub-reflector 131 to a predetermined position, the restriction of the rib 141 forming the main-reflection unit 121, of which the deployment has been restricted, is released. Since the restriction is automatically released along with the movement of the sub-reflector 131, it is not necessary to newly add a driving device for releasing the restriction, and the deployment can be performed more easily.

Third Embodiment

In the first embodiment and the second embodiment, a case where the other end of the restriction member 182 of the restriction mechanism 180 is locked to the pin 181 and unlocked in accordance with the movement of the sub-reflector 131 has been described. In a third embodiment, a case where the restriction member 182 of a restriction mechanism 280 is cut by using a blade 285 to release the restriction instead of locking and unlocking using the pin 181. Additionally, the present embodiment has the same configuration as that of the first embodiment except for the points which will be specifically described below. Therefore, a detailed description of the same configuration will be omitted.

FIG. 14A is a diagram conceptually illustrating a restriction state of the rib 141 according to the third embodiment of the present disclosure. FIG. 14B is a diagram conceptually illustrating the restriction state of the rib 141 according to the third embodiment of the present disclosure. Specifically, FIG. 14A is a diagram illustrating a stored state in which the rib 141 is folded along the outer circumference of the hub 143 and the deployment of the rib 141 is restricted by a restriction member 282. According to FIG. 14A, similarly to FIG. 11A, the restriction member 282 is wound so as to bundle the rib 141 folded along the outer circumference of the hub 143. At this time, the restriction member 282 passes through a through hole 281 formed in the joint 135 and is fixed to the top plate 311 by a screw 283. That is, in the present embodiment, when the rib 141 is restricted by the restriction member 282, both one end and the other end of the restriction member 282 are fixed to any member by the screw 283 and the screw 284.

The joint 135 has the blade 285 extending along a direction in which the joint 135 is moved by the delivery device 150. Also, the restriction member 282 is provided in a direction in which the joint 135 is moved with respect to the blade 285.

Next, FIG. 14B is a diagram illustrating a state in which the restriction of the deployment by the restriction member 282 is released and the rib 141 is being deployed. According to FIG. 14B, the second support rod 134 is delivered in a direction of an arrow H by the delivery device 150, and the sub-reflector 131 (not illustrated) and the joint 135 are also moved according to the delivery of the second support rod 134. Here, the joint 135 has the blade 285 extending along a direction in which the joint 135 is moved by the delivery device 150. Furthermore, the restriction member 282 is wound in a direction in which the joint 135 is moved with respect to the blade 285. Therefore, the blade 285 is moved in a direction of the restriction member 282 as the joint 135 is moved, whereby the restriction member 282 is cut. According to this, the restriction of the restriction member is released, and the rib 141 is deployed in a deploying direction, that is, in a direction of an arrow 1 by elastic force of the ribs 141 itself.

Additionally, the blade 285 is disposed at the joint 135, but an arrangement position of the blade 285 is not limited to the joint 135. That is, the blade 285 is a member which is moved along with the movement of the sub-reflector 131, and may be disposed at any position as long as the restriction member 282 is provided in a movement direction of the blade 285 at the time of the storage.

As described above, in the present embodiment, in a state in which the antenna apparatus 10 is stored, at least a part of the sub-reflection unit 122 is accommodated inside the main body 300, and a portion accommodated outside the main body 300 at the time of the deployment is delivered, and the sub-reflector 131 is disposed at a predetermined position. According to this, in contrast to the related art in which it has been difficult to compactly store the sub-reflection unit 122 by a height of the sub-reflection unit 122, but it is possible to store the sub-reflection unit 122 more compactly. Furthermore, by moving the sub-reflector 131 to a predetermined position, the restriction of the rib 141 forming the main-reflection taut 121, of which the deployment has been restricted, is released. Since the restriction is automatically released along with the movement of the sub-reflector 131, it is not necessary to newly add a driving device for releasing the restriction, and the deployment can be performed more easily.

<Others>

In the first embodiment, the second embodiment, and the third embodiment, a case where the sub-reflection unit 122 functions as the restriction release member has been described. However, the member that functions as the restriction release member is not limited to only the sub-reflection unit 122. For example, even in a case where the sub-reflection unit 122 is not moved and fixedly installed, or even in a case where the sub-reflection unit 122 is movably installed, other members can be used as the restriction release member. For example, a dedicated member that releases the restriction in response to the delivery instruction from the ground station (T11 in FIG. 12), or other members which need to be moved along with the deployment of the main-reflection unit 121 can be used as the restriction release member.

In the first embodiment, the second embodiment, and the third embodiment, the recessed grooves 136*a* and 136*c* or the recessed grooves 235*a* and 235*b* are used. However, it is not necessary to limit the shape to the recess shape, and the contact state of the protrusion 155 may be changed with other shapes. Furthermore, instead of detecting the state by using the recessed groove and the protrusion, the delivery state of the second support rod 134 may be detected by using other methods.

Furthermore, in the first embodiment, the second embodiment, and the third embodiment, the antenna apparatus 10 in which the main-reflector is formed in a parabolic shape has been described as an example. However, the present disclosure can be applied to any antenna apparatus as long as the antenna apparatus is an antenna apparatus transmitting a radio wave via the sub-reflector 131. Furthermore, in the first embodiment and the second embodiment, a case of the Cassegrain antenna has been described, but the present disclosure can be suitably applied to any antenna such as a Gregorian antenna in which the sub-reflection unit 122 is disposed to be spaced from the main-reflection taut 121 and the radiator 110 by a certain distance.

Furthermore, in the first embodiment, the second embodiment, and the third embodiment, for example, a case of the spacecraft 1 such as a small satellite has been described, but the antenna apparatus 10 can be used for other purposes. For example, the antenna apparatus 10 can be installed in an aircraft or an automobile, and used as a mobile communication apparatus.

It is also possible to make a configuration by appropriately combining or replacing each element described in each embodiment.

REFERENCE SIGNS LIST

1 spacecraft
10 antenna apparatus
100 communication unit
120 reflection unit
121 main-reflection unit
122 sub-reflection unit
150 delivery device
180 restriction mechanism
200 power supply unit
300 main body

The invention claimed is:

1. An antenna apparatus, comprising:

a main-reflection unit including a plurality of ribs formed to be deployable in a stored state in which the ribs are folded and a sheet body provided between a plurality of the ribs and configured to be capable of reflecting a radio wave radiated from a radiator and emitting the radio wave outside; and a restriction member configured to restrict deployment of the plurality of ribs in the stored state, and release the restriction by operation of a restriction release member different from the main-reflection unit;

a sub-reflection unit that faces the main-reflection unit and includes a sub-reflector shaped and sized to reflect the radio wave radiated from the radiator to the main-reflection unit when in use;

wherein the sub-reflection unit is the restriction release member, and the sub-reflection unit is configured to be movable so as to be at a position in which the sub-reflector reflects the radio wave to the main-reflection unit when in use.

2. The antenna apparatus according to claim 1, wherein each of a plurality of the ribs has elasticity, and is deployable from the stored state by the elasticity.

3. The antenna apparatus according to claim 1, wherein each of a plurality of the ribs is folded about a hub having a circular shape, an elliptical shape, or a polygonal shape in cross section.

4. The antenna apparatus according to claim 3, wherein one end of each of a plurality of the ribs is connected to the hub along an outer circumference of the hub.

5. A spacecraft comprising the antenna apparatus according to claim 1.

6. The antenna apparatus according to claim 1, wherein the restriction member has softness or flexibility, and has a string shape, a band shape, a rod shape, or a wire shape.

7. The antenna apparatus according to claim 1, wherein one end and the other end of the restriction member are fixed in the stored state, and the restriction is released when the restriction member is cut by movement of the sub-reflector.

8. The antenna apparatus according to claim 1, wherein the sub-reflector is movable to the position in which the sub-reflector reflects the radio wave to the main-reflection unit when in use by drive of a motor.

9. The antenna apparatus according to claim 1, wherein at least one end of the restriction member is detachably locked in the stored state, and the restriction is released when the one end is unlocked by movement of the sub-reflector.

10. The antenna apparatus according to claim 9, wherein the one end is locked to a locking member that is moved in accordance with movement of the sub-reflector in the stored state.

11. An antenna apparatus, comprising:

a main-reflection unit including a plurality of ribs formed to be deployable in a stored state in which the ribs are folded and a sheet body provided between a plurality of the ribs and configured to be capable of reflecting a radio wave radiated from a radiator and emitting the radio wave outside; and a restriction member configured to restrict deployment of the plurality of ribs in the stored state, and release the restriction by operation of a restriction release member different from the main-reflection unit;

a sub-reflection unit that faces the main-reflection unit and includes a sub-reflector shaped and sized to reflect the radio wave radiated from the radiator to the main-reflection unit when in use;

wherein the sub-reflection unit is configured to be movable so as to be at a position in which the sub-reflector reflects the radio wave to the main-reflection unit when in use; and wherein at least one end of the restriction member is detachably locked in the stored state, and the restriction is released when the one end is unlocked by movement of the sub-reflector.

12. The antenna apparatus according to claim 11, wherein the restriction release member is the sub-reflection unit.

13. A spacecraft comprising the antenna apparatus according to claim 11.

14. An antenna apparatus, comprising:

a main-reflection unit including a plurality of ribs formed to be deployable in a stored state in which the ribs are folded and a sheet body provided between a plurality of the ribs and configured to be capable of reflecting a radio wave radiated from a radiator and emitting the radio wave outside; and a restriction member configured to restrict deployment of the plurality of ribs in the stored state, and release the restriction by operation of a restriction release member different from the main-reflection unit;

a sub-reflection unit that faces the main-reflection unit and includes a sub-reflector shaped and sized to reflect the radio wave radiated from the radiator to the main-reflection unit when in use;

wherein the sub-reflection unit is configured to be movable so as to be at a position in which the sub-reflector reflects the radio wave to the main-reflection unit when in use; and wherein one end and the other end of the restriction member are fixed in the stored state, and the restriction is released when the restriction member is cut by movement of the sub-reflector.

15. The antenna apparatus according to claim 14, wherein the restriction release member is the sub-reflection unit.

16. A spacecraft comprising the antenna apparatus according to claim 14.

* * * * *